United States Patent
Mitchell et al.

(10) Patent No.: US 9,846,965 B2
(45) Date of Patent: Dec. 19, 2017

(54) AUGMENTED REALITY DEVICE WITH PREDEFINED OBJECT DATA

(71) Applicant: Disney Enterprises, Inc., Burbank, CA (US)

(72) Inventors: Kenneth John Mitchell, Earlston (GB); Robert Walker Sumner, Zurich (CH)

(73) Assignee: Disney Enterprises, Inc., Burbank, CA (US)

(*) Notice: Subject to any disclaimer, the term of this patent is extended or adjusted under 35 U.S.C. 154(b) by 244 days.

(21) Appl. No.: 13/835,459

(22) Filed: Mar. 15, 2013

(65) Prior Publication Data

US 2014/0267404 A1 Sep. 18, 2014

(51) Int. Cl.
*G06T 19/00* (2011.01)

(52) U.S. Cl.
CPC .................. *G06T 19/006* (2013.01)

(58) Field of Classification Search
None
See application file for complete search history.

(56) References Cited

U.S. PATENT DOCUMENTS

| | | | | |
|---|---|---|---|---|
| 6,493,115 | B1* | 12/2002 | Kanno et al. | 358/538 |
| 7,050,078 | B2 | 5/2006 | Dempski | |
| 7,138,963 | B2 | 11/2006 | Hobgood et al. | |
| 2003/0210228 | A1 | 11/2003 | Ebersole et al. | |
| 2004/0239670 | A1* | 12/2004 | Marks | A63F 13/10 345/419 |
| 2007/0011141 | A1 | 1/2007 | Foucault et al. | |
| 2007/0035562 | A1 | 2/2007 | Azuma et al. | |
| 2007/0038944 | A1 | 2/2007 | Carignano et al. | |
| 2009/0109240 | A1 | 4/2009 | Englert et al. | |
| 2009/0190003 | A1* | 7/2009 | Park et al. | 348/239 |
| 2010/0203933 | A1 | 8/2010 | Eyzaguirre et al. | |
| 2010/0302138 | A1* | 12/2010 | Poot et al. | 345/156 |
| 2010/0315491 | A1 | 12/2010 | Carter et al. | |
| 2011/0102460 | A1 | 5/2011 | Parker | |
| 2011/0181497 | A1 | 7/2011 | Raviv | |

(Continued)

FOREIGN PATENT DOCUMENTS

| | | |
|---|---|---|
| WO | 2011015470 A2 | 2/2011 |
| WO | 2012027594 A2 | 3/2012 |

OTHER PUBLICATIONS

Research project at BMW, "BMW augmented reality" found at https://www.youtube.com/watch?v=P9KPJIA5yds, uploaded on Oct 3, 2007. Snapshots taken on Mar. 24, 2016 were saved in the attached NPL file BMW-video_Snapshots.pdf.*

(Continued)

*Primary Examiner* — Yi Wang
(74) *Attorney, Agent, or Firm* — Patterson + Sheridan, LLP

(57) ABSTRACT

Techniques for displaying an augmented reality toy. Embodiments capture a visual scene for display. The visual scene includes a first physical object and is captured using one or more camera devices. The first physical object is identified as a first predetermined object type, based on one or more object identifiers associated with the first physical object. Embodiments retrieve predefined geometric information corresponding to the first predetermined object type and render a sequence of frames for display in which the captured visual scene is augmented, based on the predefined geometric information.

27 Claims, 5 Drawing Sheets

(56) References Cited

U.S. PATENT DOCUMENTS

| | | | |
|---|---|---|---|
| 2011/0186625 | A1 | 8/2011 | Mangione-Smith |
| 2012/0019557 | A1 | 1/2012 | Aronsson et al. |
| 2012/0044263 | A1 | 2/2012 | Kim et al. |
| 2012/0047233 | A1 | 2/2012 | Jin |
| 2012/0054635 | A1 | 3/2012 | Park et al. |
| 2012/0092328 | A1* | 4/2012 | Flaks et al. ............ 345/419 |
| 2012/0092370 | A1 | 4/2012 | Oh et al. |
| 2012/0093320 | A1 | 4/2012 | Flaks et al. |
| 2012/0122570 | A1* | 5/2012 | Baronoff ............ 463/31 |
| 2013/0050258 | A1* | 2/2013 | Liu et al. ............ 345/633 |
| 2013/0328762 | A1* | 12/2013 | McCulloch et al. ...... 345/156 |

OTHER PUBLICATIONS

Hinske et al., "An Infrastructure for Interactive and Playful Learning in Augmented Toy Environments", IEEE International Conference on Pervasive Computing and Communications, Mar. 9-13, 2009, pp. 1-6, Galveston, US.

Piumsomboon et al., "Physically-based Interaction for Tabletop Augmented Reality Using a Depth-sensing Camera for Environment Mapping", Proceedings of the 26th International Conference on Image and Vision Computing New Zealand, 2011, Auckland, New Zealand. pp. 161-166.

Hinske et al., "W41K: Digitally Augmenting Traditional Game Environments", Proceedings of the 3rd International Conference on Tangible and Embedded Interaction, 2009, pp. 99-106, New York, USA.

* cited by examiner

AUGMENTED REALITY DEVICE WITH PREDEFINED OBJECT DATA

BACKGROUND

Field of the Invention

The present invention generally relates to a human-computer interface and more specifically to techniques for recognizing and displaying predefined objects on an augmented reality device.

Description of the Related Art

Computer graphics technology has come a long way since video games were first developed. Relatively inexpensive 3D graphics engines now provide nearly photo-realistic interactive game play on hand-held video game, home video game and personal computer hardware platforms costing only a few hundred dollars. These video game systems typically include a hand-held controller, game controller, or, in the case of a hand-held video game platform, an integrated controller. A user or player uses the controller to send commands or other instructions to the video game system to control a video game or other simulation being played. For example, the controller may be provided with a manipulator (e.g., a joystick) and buttons operated by the user.

Many hand-held gaming devices include some form of camera device which may be used to capture an image or a series of images of a physical, real-world scene. The captured images can then be displayed, for instance, on a display of the hand-held gaming device. Certain devices may be configured to insert virtual objects into the captured images before the images are displayed. Additionally, other devices or applications may enable users to draw or paint particular within a captured image of a physical scene. However, as such alterations apply only to a single image of the physical scene, subsequent captured images of the physical scene from different perspectives may not incorporate the user's alterations.

SUMMARY

Embodiments provide a method, computer-readable memory and augmented reality device for displaying a first physical object. The method, computer-readable memory and augmented reality device include capturing a visual scene for display. The visual scene includes the first physical object and is captured using one or more camera devices. The method, computer-readable memory and augmented reality device also include identifying the first physical object as a first predetermined object type, based on one or more object identifiers associated with the first physical object. Additionally, the method, computer-readable memory and augmented reality device include retrieving predefined geometric information corresponding to the first predetermined object type. The method, computer-readable memory and augmented reality device further include rendering a sequence of frames for display in which the captured visual scene is augmented, based on the predefined geometric information

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
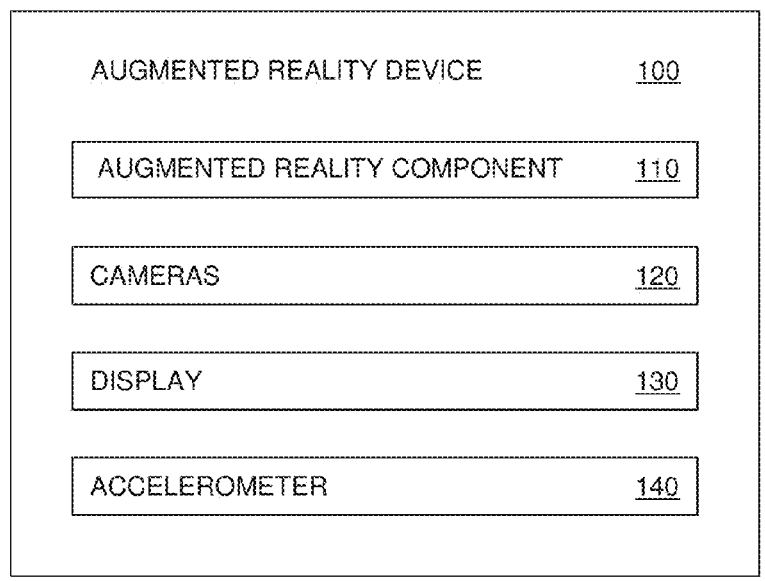
FIG. 1 is a block diagram illustrating an augmented reality device configured with an augmented reality component, according to one embodiment described herein.

Generally, embodiments of the invention provide techniques for displaying content on an augmented reality device. As used herein, an augmented reality device refers to any device capable of displaying a real-time view of a physical, real-world environment while altering elements within the displayed view of the environment. As such, unlike a virtual reality device which displays a view of virtual world, an augmented reality device displays a view of the real world but augments elements using computer graphics technology. Such an augmented reality device may include and/or be communicatively coupled to a camera device (or multiple camera devices) used to capture a view of the real-world environment and may further include computer software and/or hardware configured to augment elements of the captured scene. For example, an augmented reality device could capture a series of images of a coffee cup sitting on top of a table, modify the series of images so that the coffee cup appears as an animated cartoon character and display the modified series of images in real-time to a user. As such, when the user looks at the augmented reality device, the user sees an augmented view of the physical real-world environment in which the user is located.

Embodiments provide techniques for displaying an augmented reality toy on an augmented reality device. Software on the augmented reality device may capturing a visual scene for display using one or more cameras of the augmented reality device. The visual scene includes the augmented reality toy. For example, cameras could be used to capture one or more images of a toy castle sitting atop a table. The software could identify the augmented reality toy as a first predetermined object type, based on one or more object identifiers associated with the first physical object. For example, the toy castle could include a marker that corresponds to a particular object type, where different types of augmented reality toys are labeled with different markers, each corresponding to a respective object type. Additionally, the marker could be embedded using a material that is difficult or impossible to see with the human eye (e.g., an infrared-absorbing ink). In such an example, the augmented reality device could be configured with an infrared camera capable of detecting the embedded marker and, upon detecting the embedded marker, the software could determine the predetermined object type that the particular marker corresponds to (e.g., a particular type of toy castle).

Furthermore, the software could be configured to identify the object type of the augmented reality toy based on its shape. For instance, the software on the augmented reality device could analyze the visual scene to determine a plurality of edges of the first physical object within the visual scene, and could use the determined plurality of edges to identify the predetermined object type of the augmented reality toy. In one embodiment, the augmented reality toy is configured with a transmitter (e.g., a RF transmitter) that transmits a signal with embedded data specifying an object type identification code. Software on the augmented reality device could receive the signal and could determine the predetermined object type based on the specified object type identification code.

Additionally, the software could retrieve predefined geometric information corresponding to the first predetermined object type. The geometric information could specify, for instance, dimensions of objects in the predetermined object type, the shape of the objects in the predetermined object type, and so on. Additionally, the geometric information could identify one of more effect areas on the objects in the predetermined object type. Continuing the example, the toy castle could include several windows and these could be identified as effect areas in the geometric data for the castle.

The software could then render a sequence of frames for display in which an appearance of the first physical object is augmented, based on the predefined geometric information. For example, the window effect areas on the toy castle could be augmented to appear as if light is emitting from the windows. As another example, one or more animated virtual characters could be depicted on, in or around the augmented reality toy. For instance, an animated virtual character could be shown through the castle windows in the sequence of frames walking around a room within the toy castle. Of note, such a depiction may be shown, even though the toy castle itself may not include any interior rooms. For example, when viewed outside of the augmented reality device, the toy castle could be a plastic castle with several stickers depicting windows. However, when viewed through the augmented reality device, these windows could appear as realistic windows emitting light from an interior room of the castle, and with one or more animated virtual characters moving throughout the room. Advantageously, doing so provides an improved experience for users of the augmented reality toy.

FIG. 1 is a block diagram illustrating an augmented reality device configured with a display correction component, according to one embodiment of the present invention. As shown, the augmented reality device 100 includes an augmented reality component 110, camera devices 120, a display device 130 and an accelerometer 140. The camera devices 120 may include cameras for capturing a visual scene. As used herein, a visual scene refers to a view(s) of the real-world environment in which the device 100 is being used. For instance, a visual scene may be a series of images of a real-world environment. The camera devices 120 may also include one or more user-facing cameras. The augmented reality component 110 could use such a user-facing camera device 120 to, e.g., determine an angle at which the user is viewing the display device 130. Generally, the accelerometer 140 is a device capable of measuring the physical (or proper) acceleration of the augmented reality device 100. The augmented reality component 110 may use the accelerometer 140 to, e.g., determine when the position of the augmented reality device 100 is changing, which could indicate the user's viewing angle of the display device 130 is also changing.

Generally, the augmented reality component 110 is configured to recognize augmented reality toys within a visual scene (e.g., a series of frames captured using the camera devices 120) and to adjust the depiction of the visual scene on the augmented reality device based on predefined data associated with the augmented reality toys. For instance, the augmented reality component 110 could analyze a visual scene captured using the cameras 120 and identify augmented reality toys within the visual scene. More specifically, as the visual scene represents a three-dimensional space (i.e., the physical environment captured using the cameras 120), the augmented reality component 110 could determine an area of three-dimensional space occupied by each identified augmented reality toy. For example, the augmented reality component 110 could be preconfigured with geometric data that defines geometric properties (e.g., size, shape, color, etc.) for particular toys, and could use the geometric data to identify instances of the predefined toys within the visual scene and the three-dimensional space each object occupies.

In one embodiment, the augmented reality toy is configured with a transmitter (e.g., a radio frequency (RF) transmitter) that sends out a signal encoded with data specifying a type identifier. In such an embodiment, the augmented reality component 110 could receive the signal (e.g., using a receiver or transceiver on the augmented reality device 100) and could determine the type identifier encoded within the signal. The augmented reality component 110 could then determine the type of the toy, based on the type identifier.

In another embodiment, the augmented reality toy may contain an embedded marker that identifies the type of the toy. For instance, the augmented reality toy could contain a quick response (QR) code that specifies a type identifier corresponding to the type of the toy. More generally, however, any type of marker capable of identifying a type or a type identifier may be used. The augmented reality component 110 could then detect the embedded marker (e.g., using a camera 120 of the augmented reality device 100) and could determine the type of the toy based on the embedded marker. In a particular embodiment, the embedded marker is impossible or difficult to detect using the human eye. For example, the embedded marker could be expressed using an infrared-absorbing material that is invisible or nearly invisible to the human eye, and the augmented reality component 110 could be configured to detect the embedded marker using one or more infrared cameras on the augmented reality device 100. Advantageously, doing so allows the marker to be embedded in the augmented reality toy without disrupting the aesthetics of the toy.

Upon identifying an augmented reality toy within the visual scene, the augmented reality component 110 could then retrieve predefined data associated with the identified toy. For example, the augmented reality component 110 could determine that the augmented reality toy is a castle and could retrieve augmentation data associated with the castle object type. Such augmentation data could specify, for instance, one or more areas of the castle toy to augment and how the areas should be augmented. As an example, the physical castle toy could include several stickers that depict windows of the castle, the augmentation data could specify that these stickers should be augmented to appear as real windows that emit light. Additionally, the augmentation data could specify that the augmented windows should depict one or more animated virtual characters shown within the castle. The augmented reality component 110 could then render a series of frames depicting an augmented virtual scene based on the augmentation data. Advantageously, by recognizing the physical toy as a particular type of augmented reality toy, the augmented reality component 110 can provide augmentations that are specific to the particular type of toy, thereby enhancing the appearance of the toy and the user's experience with the toy.

Additionally, the augmented reality component 110 could depict interactions between virtual characters and the augmented reality toy based on the type of the toy. For instance, upon detecting an arctic castle toy, the augmented reality component 110 could generate a series of frames depicting an ice patch next to the toy. Moreover, upon determining that a virtual character within the augmented reality scene is coming into contact with the ice patch, the augmented reality component 110 could depict the virtual character as slipping on the ice. Advantageously, doing so helps to create a more immersive and improved experience for users of the augmented reality toy.

In addition to identifying the type of the augmented reality toy, the augmented reality component 110 can use predefined geometric data associated with the type of toy to augment the augmented reality toy's appearance. For instance, such geometric data could specify the shape and dimensions of a staircase on the augmented reality castle, and the augmented reality component 110 could use this information to render frames realistically depicting a virtual character walking up the steps of the toy castle. Additionally, by pre-configuring the augmented reality component 110 with geometric data specifying the shape of the stairs, the augmented reality component 110 does not need to approximate the shape and size of the stairs based on the toy's appearance in the captured visual scene.

Additionally, the augmented reality component 110 on the augmented reality device could measure one or more environmental illumination characteristics of an environment in which the augmented reality device is located. Environmental illumination characteristics could include, for instance, a position of a light source within an environment in which the augmented reality device is located, an angle of the light source, an indication of whether the light source is omnidirectional, a color of the light source, and an intensity of the light source and a reflectivity value of the first physical object. Based on the environmental illumination characteristics, the augmented reality component 110 could adjust the appearance of the augmented first physical object and virtual characters/objects within the augmented reality scene, based on the measured one or more environmental illumination characteristics. For instance, the augmented reality component 110 could identify one or more shadows within the visual scene and could render shadows for one or more virtual characters or objects within the augmented reality scene based on the identified shadows. As an example, the augmented reality component 110 could determine that a toy castle has a shadow on the left side of the captured visual scene, indicating that a light source is shining on the toy castle from the right side of the captured visual scene. In such an example, the augmented reality component 110 could render shadows for virtual objects and characters in the augmented reality scene, based on a virtual light source shining from the right side of the augmented reality scene.

While the aforementioned examples refer to identifying light sources based on shadows of physical objects within the captured visual scene, these examples are without limitation and it is contemplated that numerous other techniques could be used to identify light sources within the physical environment. For instance, the augmented reality device 100 could be configured with multiple cameras positioned on multiple, different sides of the device 100, and the augmented reality component 110 could use images from these other cameras to identify light sources positioned throughout the physical environment. As another example, the rendered sequence of frames could depict a virtual pond positioned on the table next to the toy castle and could augment the appearance of the virtual pond to show reflections from one or more light sources within the environment. Moreover, the augmented reality component 110 could depict these reflections as having an effect on other virtual objects/characters or the physical toy within the augmented reality scene. For instance, the augmented reality component 110 could depict light reflected from the virtual pond shining onto the walls of the toy castle. Doing so provides a more dynamic and realistic augmented reality world that is capable of adapting to the environment in which the augmented reality device is located.

In addition to augmenting the appearance of the augmented reality toy, the augmented reality component 110 could also augment the acoustics of the toy. For instance, the augmented reality component 110 could be configured to recognize a stuffed animal dog toy, and when viewing the toy dog with the augmented reality device, the augmented reality component 110 could play sound effects associated with the toy dog. For instance, when the user views the toy dog with the augmented reality device, the augmented reality component 110 could render a series of frames depicting the toy dog as an animated dog and could further play sound effects corresponding to the animation (e.g., a barking noise when the animated dog barks).

Additionally, the augmented reality component 110 could be configured to depict interactions between animated virtual character and the augmented reality toy based on a set of dynamics rules. The dynamics rules may define dynamics interactions for visual scenes displayed on the augmented reality device. In one embodiment, the dynamics rules used may be determined based on the type of augmented reality toy in the visual scene. As an example, a spaceship augmented reality toy could be associated with a set of low-gravity dynamics rules and the augmented reality component 110, upon detecting the visual scene includes the spaceship toy, could apply the set of low-gravity dynamics rules to virtual characters within the augmented reality scene.

While the aforementioned example describes an embodiment configured to augment a three-dimensional toy's appearance, such an example is without limitation and is provided for illustrative purposes only. Moreover, it is explicitly contemplated that embodiments can be configured to interact with two-dimensional objects as well. For example, an augmented reality device could be configured to recognize and augment images shown on the pages of a story book. As an example, a first page of a story book could include a picture of a castle and could include an embedded marker (e.g., a unique symbol embedded in the page using an infrared ink). In such an example, the augmented reality component 110 could capture a visual scene including the page of the book and could further detect the embedded marker (e.g., using an infrared camera). The augmented reality component 110 could then render frames depicting the castle on the page as having one or more augmentations. For example, the augmented castle could appear to stand out from the page and have a three-dimensional appearance. Additionally, a virtual character could be shown moving about the page and interacting with the castle. Advantageously, doing so allows the two-dimensional picture of the castle to, in effect, "come alive" with an altered appearance and/or interactions with virtual characters in the augmented reality world, thereby enhancing the user's experience with the story book.

Figure 2:
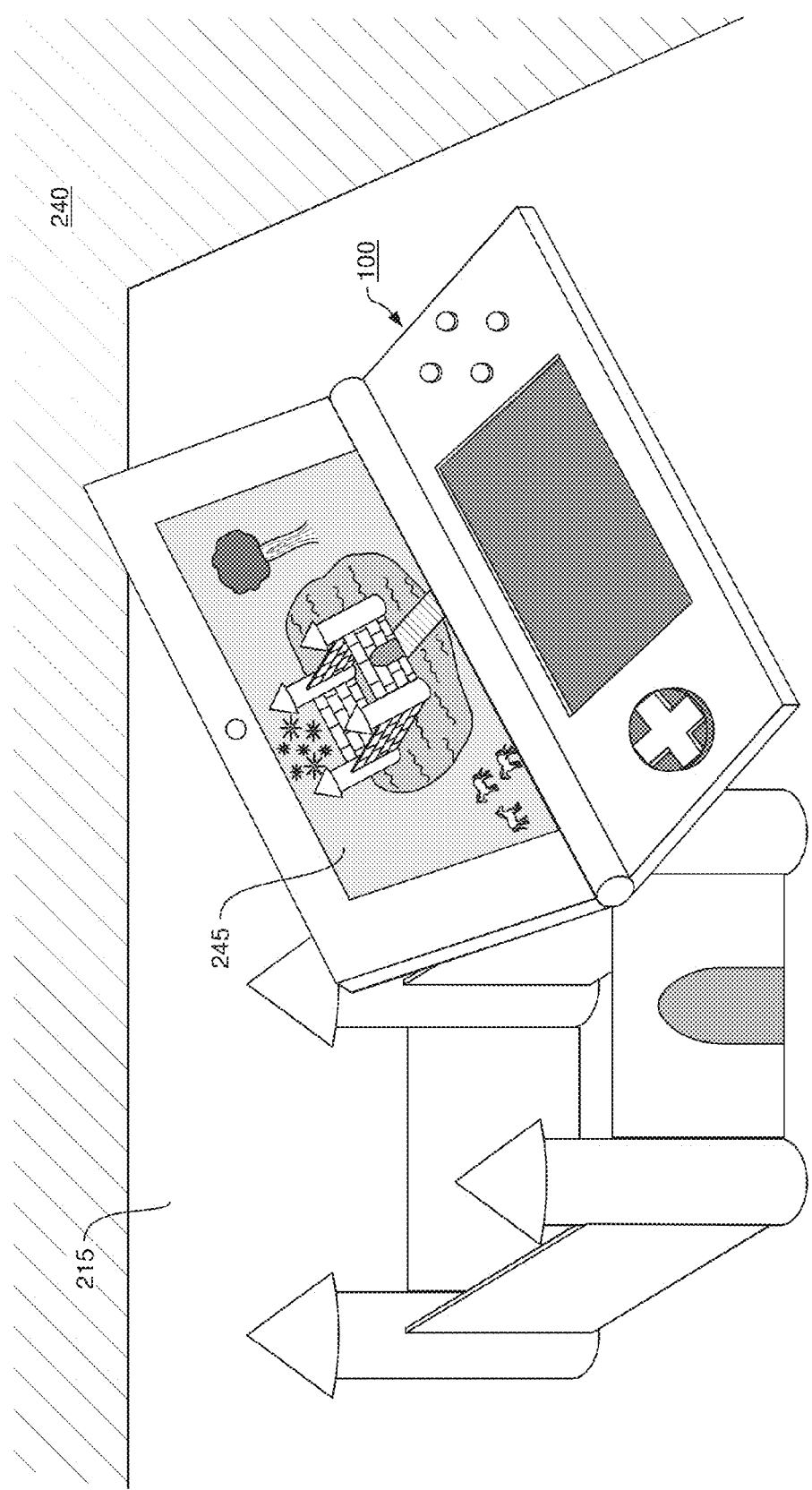
FIG. 2 illustrates an augmented reality device viewing an augmented reality toy, according to one embodiment described herein.

FIG. 2 illustrates an augmented reality device viewing an augmented reality toy, according to one embodiment described herein. As shown, the scene 240 includes a toy castle 210 sitting atop a table 215. Additionally, the scene 240 includes an augmented reality device 100 that is viewing the toy castle 210 and is rendering and displaying one or more frames depicting an augmented reality scene on its display device 245. As discussed above, the augmented reality component 110 could identify the type of the toy castle 210 (e.g., based on the appearance of the toy castle, based on a type identifier encoded in a signal, based on an embedded marker, etc.) and could augment the appearance of the toy castle 210 as shown on the augmented reality device 100 based on the determined type.

Figure 3:
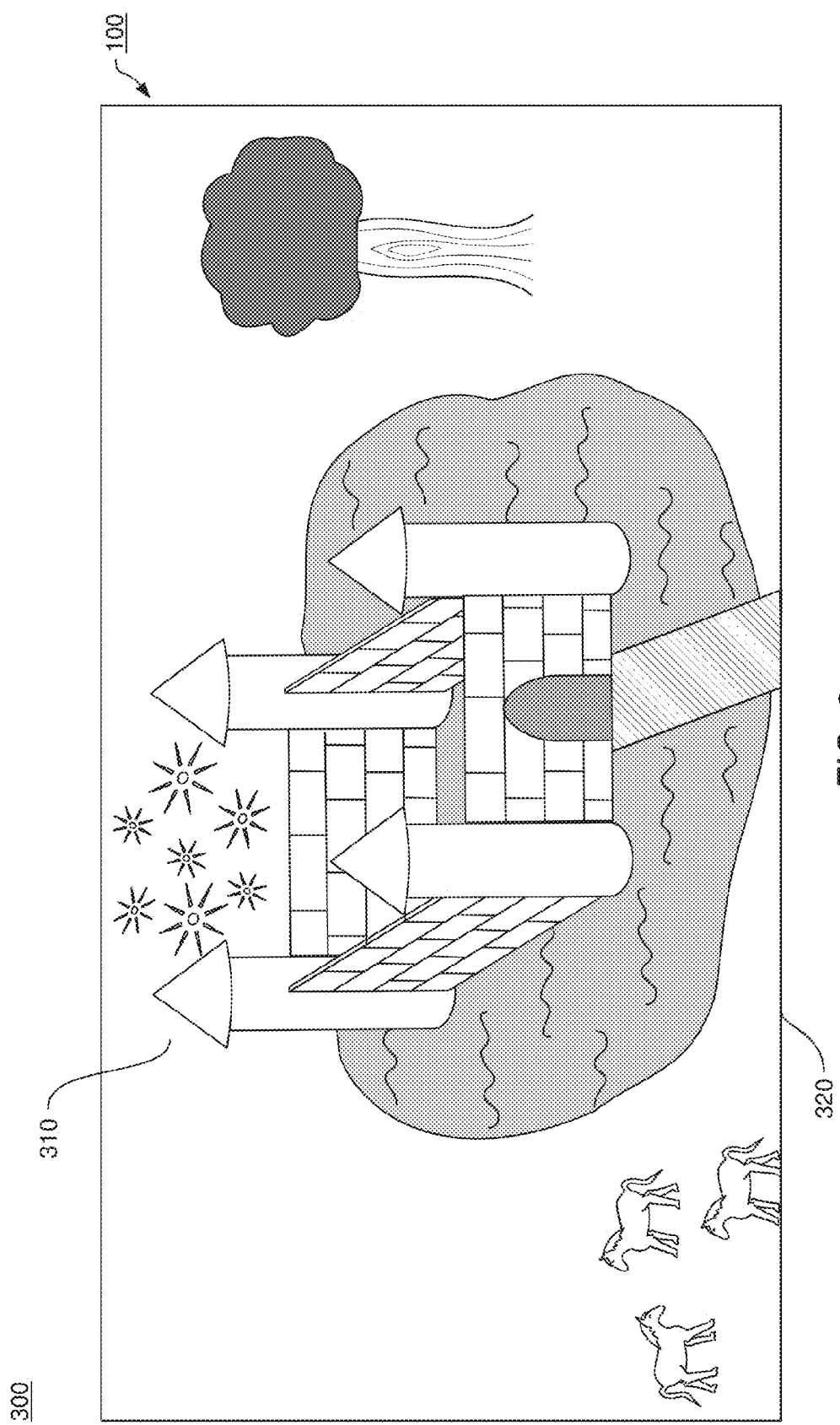
FIG. 3 is a screenshot of the screen of the augmented reality device shown in FIG. 2, according to one embodiment described herein.

As shown on the display device 245, a number of different augmentations have been applied to the toy castle. FIG. 3 shows a screenshot of the screen of the augmented reality device shown in FIG. 2, according to one embodiment described herein. Here, the screenshot 300 includes a visual depiction 310 of the castle 210 and a number of different augmentations. The augmentations include a moat 320, fireworks 330, ponies 340, a tree 350 and a drawbridge 360. Of note, the physical toy castle 210 depicted in FIG. 2 does not include any of the augmentations 320, 330, 340, 350 and 360, but instead these augmentations have been created and applied to the castle's appearance on the augmented reality device 100 based on a determination of the toy type of the physical castle 210.

Moreover, the various augmentations may be static virtual objects or animated virtual objects. For instance, in the depicted example, the drawbridge 360 could appear as static, while the fireworks 330 could appear as an animated virtual object. Additionally, the various virtual objects depicted in the augmented reality scene may appear to interact with one another. For instance, the ponies 340 could appear to walk around the augmented reality scene and could enter the castle by crossing the drawbridge 360. Furthermore, in some situations, the virtual objects 340 may appear as fully or partially occluded by other virtual objects or by the toy castle 310. For example, as the ponies cross the draw bridge, they could be partially or fully occluded by the castle 310. In one embodiment, the augmented reality component 110 is configured to optimize the depicted scene by performing occlusion culling operations for one or more of the virtual objects.

In one embodiment, the virtual objects in the augmented reality scene are depicted as visually affecting other objects (both virtual and physical) within the scene. For instance, as the fireworks 330 explode, the augmented reality component 110 could augment the appearance of the castle 310 (i.e., the physical toy) so that it appears light from the exploding fireworks is reflecting on the castle 310. Additionally, the augmented reality component 110 could augment the appearance of the water 320 (i.e., a virtual object) could be augmented so show the reflection of the exploding fireworks.

As discussed above, the augmented reality component 110 is configured to determine an object type of the toy castle and to generate the augmentations based on the determined type. Thus, while the particular castle includes augmentations such as fireworks 330 and a moat 320, a different toy castle (e.g., an ice castle) could include other, different augmentations (e.g., Eskimos, polar bears, etc.). More generally, it is broadly contemplated that any type of augmented reality toy and virtual objects may be used, consistent with the functionality described herein. Advantageously, by determining an object type of the augmented reality toy and by generating the augmented reality scene based on the determined object type, embodiments can realistically depict augmentations for the augmented reality toy and can tailor the augmentations to be contextually relevant to the augmented reality toy.

In one embodiment, the augmented reality component 110 is configured to render virtual characters that interact in different ways with the physical toy, based on a state of the physical toy. For instance, assume that a second castle toy includes a physical drawbridge that a child can open and close. When the second castle toy is viewed with the augmented reality device, the augmented reality component 110 could determine which state the drawbridge is currently in and could render animated virtual characters accordingly. Thus, for example, an animated virtual character could appear to walk across the drawbridge and enter the castle when the drawbridge is lowered (i.e., a first state), and the animated virtual character could appear to be trapped either inside or outside of the castle when the drawbridge is raised (i.e., a second state). Advantageously, doing so provides a more immersive and interactive experience for users of the augmented reality device.

In a particular embodiment, the augmented reality component 110 on a first augmented reality device is configured to synchronize with a second augmented reality component 110 on a second augmented reality device. Such synchronization can occur between local augmented reality components, remote augmented reality components, or a combination therebetween. For example, two separate users with two separate augmented reality devices could view the same toy castle at the same time. In such an example, the augmented reality components 110 on each of the augmented reality devices could synchronize with one another, such that each of the two users sees the same augmentations to the castle occurring at the same time. As another example, a remote user could be viewing a separate instance of the toy castle remotely from the two users, but could be in contact (e.g., via video conferencing) with the two users. In such an example, the augmented reality component 110 on the remote user's augmented reality device could synchronize (e.g., over a network such as the Internet) with the augmented reality devices of the two local users, such that the two local users and the remote user all see the same augmentations occurring at the same time on their augmented reality devices. Advantageously, doing so helps to provide a more immersive experience for users of the augmented reality device, when there are multiple users viewing the same physical (and/or different instances of the physical object) at the same time using augmented reality devices.

Figure 4:
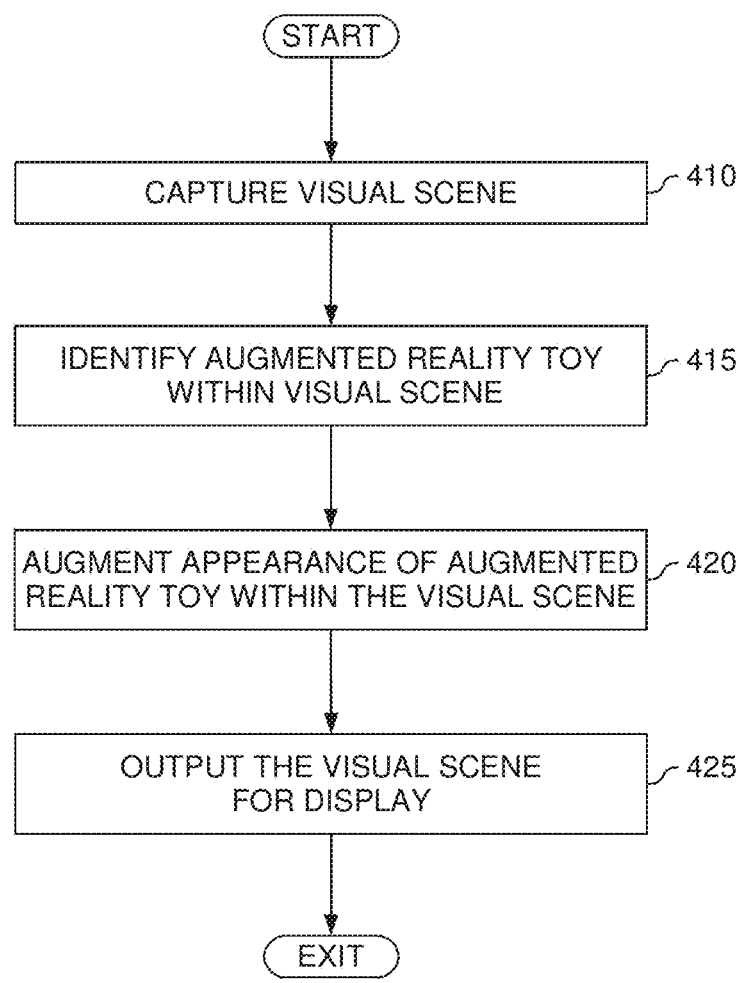
FIG. 4 is a flow diagram illustrating a method for displaying an augmented reality toy on an augmented reality device, according to one embodiment described herein.

FIG. 4 is a flow diagram illustrating a method for displaying an augmented reality toy on an augmented reality device, according to one embodiment described herein. As shown, the method 400 begins at block 410, where the augmented reality component 110 captures a visual scene. For instance, the augmented reality component 110 could use one or more cameras 120 on the augmented reality device 100 to capture the visual scene.

The augmented reality component 110 then identifies an augmented reality toy within the visual scene and determines an object type of the augmented reality toy (block 415). As discussed above, the augmented reality component 110 could identify the augmented reality toy using a variety of techniques. For instance, the augmented reality component 110 could be preconfigured with geometric data (e.g., size, shape, coloration, etc.) for various types of augmented reality toys, and the augmented reality component 110 could use the geometric data to identify the augmented reality toy within the visual scene as a particular object type. As an example, where the augmented reality component 110 is configured with the geometric data for several different types of augmented reality toys, the augmented reality component 110 could determine which set of geometric data best matches the toy in the visual scene.

In one embodiment, the augmented reality component 110 is configured to identify the augmented toy by detecting a marker embedded within the toy. For example, a QR code could be embedded in the toy using an infrared material (e.g., an infrared ink), such that the QR code is difficult if not impossible to see with the human eye. In such an example, the augmented reality component 110 could use one or more infrared cameras on the augmented reality device to detect the QR code and could then determine an object type corresponding to the detected QR code.

In a particular embodiment, the augmented reality toy is configured with an RF transmitter (or transceiver) that transmits a signal encoded with an object type identifier. The augmented reality component 110 could then use an RF receiver (or transceiver) in the augmented reality device 100 to receive the signal. The augmented reality component 110 could then analyze determine the object type identifier encoded within the received signal and could determine the object type based on this identifier. Generally, any of the aforementioned techniques may be used for identifying the augmented reality toy, or a combination of these techniques may be used. For instance, the augmented reality component 110 could identify the toy as a first object type based on the geometric data and could confirm the identification by verifying that a signal specifying the first object type is being broadcast.

Upon identifying the augmented reality toy, the augmented reality component 110 augmented the appearance of the augmented reality toy within the visual scene displayed on the augmented reality device (block 420). For instance, the augmented reality component 110 could determine one or more augmentations associated with the determined object type of the augmented reality toy, and could render one or more frames depicting the determined augmentation(s) applied to the captured visual scene. As an example, where the augmented reality toy is a toy castle, the augmented reality component 110 could determine that this toy is associated with a fireworks augmentation. The augmented reality component 110 could then render frames depicting virtual fireworks going off above the toy castle. Additionally, the rendered frames may augment the appearance of the toy castle as well based on the applied augmentations. For instance, the toy castle's appearance could be augmented so that it appears light from the virtual fireworks is reflecting on to the castle displayed on the augmented reality device 100. Once augmented reality component 110 renders frames depicting one or more augmentations to the visual scene, the frames are output for display (block 425) and the method 400 ends.

Additionally, the augmented reality component 110 could be configured to use the predefined geometric data for the augmented reality toy in generating the augmentations. For instance, assume that the toy castle includes a flight of stairs leading up to the walls of the castle, and that the predefined geometric data specifies the shape and dimensions of these stairs. The augmented reality component 110 could then use the predefined geometric data to depict a virtual character walking up the flight of stairs. By preconfiguring the augmented reality device 100 with data specifying the size and shape of the stairs, the augmented reality component 110 can more accurately and realistically render frames depicting a virtual character walking up the stairs. Doing so enhances the overall appearance of the rendered frames and thus may improve the user's experience with the augmented reality device and the augmented reality toy as well.

Figure 5:
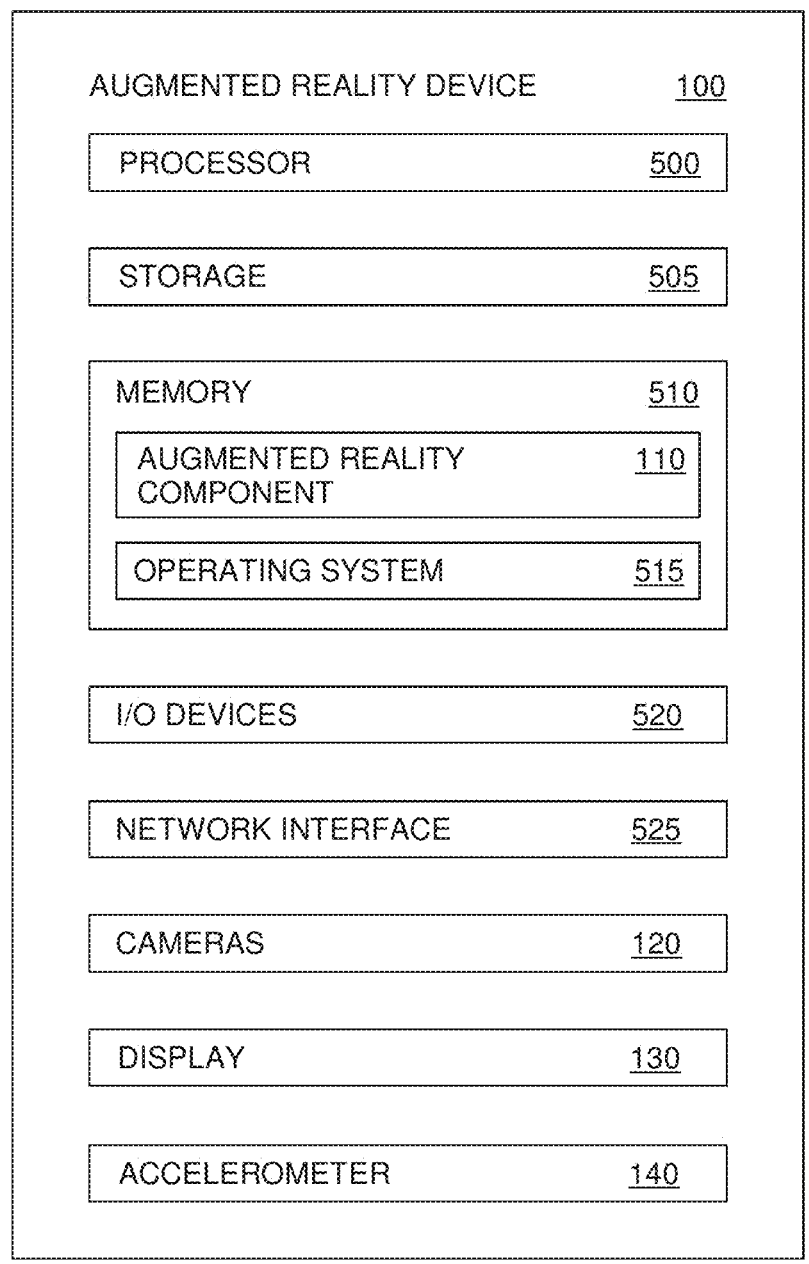
FIG. 5 is a block diagram illustrating an augmented reality device configured with an augmented reality component, according to one embodiment described herein.

FIG. 5 is a block diagram illustrating an augmented reality device configured with a surface painting component, according to one embodiment described herein. In this example, the augmented reality device 100 includes, without limitation, a processor 500, storage 505, memory 510, I/O devices 520, a network interface 525, camera devices 120, a display devices 130 and an accelerometer device 140. Generally, the processor 500 retrieves and executes programming instructions stored in the memory 510. Processor 500 is included to be representative of a single CPU, multiple CPUs, a single CPU having multiple processing cores, GPUs having multiple execution paths, and the like. The memory 510 is generally included to be representative of a random access memory. The network interface 525 enables the augmented reality device 100 to connect to a data communications network (e.g., wired Ethernet connection or an 802.11 wireless network). Further, while the depicted embodiment illustrates the components of a particular augmented reality device 100, one of ordinary skill in the art will recognize that augmented reality devices may use a variety of different hardware architectures. Moreover, it is explicitly contemplated that embodiments of the invention may be implemented using any device or computer system capable of performing the functions described herein.

The memory 510 represents any memory sufficiently large to hold the necessary programs and data structures. Memory 510 could be one or a combination of memory devices, including Random Access Memory, nonvolatile or backup memory (e.g., programmable or Flash memories, read-only memories, etc.). In addition, memory 510 and storage 505 may be considered to include memory physically located elsewhere; for example, on another computer communicatively coupled to the augmented reality device 100. Illustratively, the memory 510 includes an augmented reality component 110 and an operating system 515. The operating system 515 generally controls the execution of application programs on the augmented reality device 100. Examples of operating system 515 include UNIX, a version of the Microsoft Windows® operating system, and distributions of the Linux® operating system. (Note: Linux is a trademark of Linus Torvalds in the United States and other countries.) Additional examples of operating system 515 include custom operating systems for gaming consoles, including the custom operating systems for systems such as the Nintendo DS® and Sony PSP®.

The I/O devices 520 represent a wide variety of input and output devices, including displays, keyboards, touch screens, and so on. For instance, the I/O devices 520 may include a display device used to provide a user interface. As an example, the display may provide a touch sensitive surface allowing the user to select different applications and options within an application (e.g., to select an instance of digital media content to view). Additionally, the I/O devices 520 may include a set of buttons, switches or other physical device mechanisms for controlling the augmented reality device 100. For example, the I/O devices 520 could include a set of directional buttons used to control aspects of a video game played using the augmented reality device 100.

The augmented reality component 110 generally is configured to render frames for display on the augmented reality device that depict an augmented reality toy. The augmented reality component 110 could capture a visual scene for display. Here, the visual scene could include a first physical object captured using the camera devices 120. The augmented reality component 110 could identify the first physical object as a first predetermined object type, based on one or more object identifiers associated with the first physical object. Examples of such identifiers may include an embedded marker within the first physical object, a signal received from a transmitter associated with the first physical object, and so on. The augmented reality component 110 may also retrieve predefined geometric information corresponding to the first predetermined object type. The augmented reality component 110 may then render a sequence of frames for display in which an appearance of the first physical object is augmented, based on the predefined geometric information.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access environmental illumination data available in the cloud. For example, a augmented reality component 110 could execute on an augmented reality device 100 operated by a user and collect environment illumination data pertaining to the user's current environment. In such a case, the augmented reality component 110 could transmit the collected data to a computing system in the cloud for storage. When the user again returns to same environment, the augmented reality component 110 could query the computer system in the cloud to retrieve the environmental illumination data and could then use the retrieved data to realistically model lighting effects on painted objects within an augmented reality scene displayed on the augmented reality device 100. Doing so allows a user to access this information from any device or computer system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special-purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method of displaying a first physical object, comprising:
    capturing a visual scene for display, wherein the visual scene includes the first physical object and wherein the visual scene is captured using one or more camera devices;
    classifying the first physical object as a first predetermined object type, based on one or more object identifiers associated with the first physical object;
    upon classifying the first physical object as the first predetermined object type, retrieving predefined geometric information corresponding to the first predetermined object type, wherein the predefined geometric information provides a three-dimensional model describing a shape of objects of the first predetermined object type, and wherein the predefined geometric information specifies a first region of the three-dimensional model and one or more augmentations applicable to the first region of the objects of the first predetermined object type;
    determining which one of a plurality of configurations the first physical object is currently in, wherein the first physical object is configured to be physically manipulatable into each of the plurality of configurations; and
    rendering a sequence of frames for display in which the first region of the first physical object within the captured visual scene is animated in a predefined manner depicting a virtual light source within the first physical object, based on the determined configuration of the first physical object, by applying the one or more augmentations to a first virtual object generated based on the retrieved predefined geometric information corresponding to the first physical object in the captured visual scene.

2. The method of claim 1, wherein identifying the first physical object as the first predetermined object type further comprises:
    analyzing the visual scene to determine a plurality of edges of the first physical object within the visual scene,
    wherein the first predetermined object type is identified further based on the determined plurality of edges.

3. The method of claim 1, further comprising:
    measuring one or more environmental illumination characteristics of an environment in which an augmented reality device is located, wherein the environmental illumination characteristics include at least one of a position of a light source within an environment in which the augmented reality device is located, an angle of the light source, an indication of whether the light source is omnidirectional, a color of the light source, an intensity of the light source and a reflectivity value of the first physical object; and
    adjusting the appearance of the augmented first physical object based on the measured one or more environmental illumination characteristics.

4. The method of claim 1, wherein the visual scene is augmented to include one or more virtual objects, and further comprising:
    determining one or more illumination effects associated with a first one of the one or more virtual objects,
    wherein the visual scene is augmented further based on the determined one or more illumination effects.

5. The method of claim 1, wherein identifying the first physical object as a first predetermined object type, based on one or more object identifiers associated with the first physical object, further comprises:
  receiving a signal associated with the first physical object; and
  processing the received signal to determine the one or more object identifiers that are encoded within the signal.

6. The method of claim 1, wherein identifying the first physical object as a first predetermined object type, based on one or more object identifiers associated with the first physical object, further comprises:
  detecting an embedded marker within the first physical object; and
  determine the first physical object corresponds to the first predetermined object type, based on the detected embedded marker.

7. The method of claim 6, wherein the embedded marker is embedded in the first physical object using an infrared-absorbing material, and wherein the embedded marker is detected using an infrared camera coupled to the augmented reality device.

8. The method of claim 1, further comprising:
  inserting an animated virtual character into the visual scene,
  wherein the animated virtual character is depicted in the rendered sequence of frames as interacting with the first physical object in the rendered sequence of frames, based on the retrieved predefined geometric information.

9. The method of claim 8, further comprising:
  determining one or more dynamics rules based on the first physical object, wherein the one or more dynamics rules govern the physics that apply to the animated virtual character; and
  affecting the interaction between the animated virtual character and the first physical object based on the determined dynamics rules.

10. A computer-readable memory containing a program that, when executed, performs an operation for displaying a first physical object, comprising:
  capturing a visual scene for display, wherein the visual scene includes the first physical object and wherein the visual scene is captured using one or more camera devices;
  classifying the first physical object as a first predetermined object type, based on one or more object identifiers associated with the first physical object;
  upon classifying the first physical object as the first predetermined object type, retrieving predefined geometric information corresponding to the first predetermined object type, wherein the predefined geometric information provides a three-dimensional model describing a shape of objects of the first predetermined object type, and wherein the predefined geometric information specifies a first region of the three-dimensional model and one or more augmentations applicable to the first region of the objects of the first predetermined object type;
  determining which one of a plurality of configurations the first physical object is currently in, wherein the first physical object is capable of being physically manipulated into each of a plurality of configurations; and
  rendering a sequence of frames for display in which the first region of the first physical object within the captured visual scene is animated in a predefined manner depicting a virtual light source within the first physical object, based on the determined configuration of the first physical object, by applying the one or more augmentations to a first virtual object generated based on the retrieved predefined geometric information corresponding to the first physical object in the captured visual scene.

11. The computer-readable memory of claim 10, wherein identifying the first physical object as the first predetermined object type further comprises:
  analyzing the visual scene to determine a plurality of edges of the first physical object within the visual scene,
  wherein the first predetermined object type is identified further based on the determined plurality of edges.

12. The computer-readable memory of claim 10, the operation further comprising:
  measuring one or more environmental illumination characteristics of an environment in which an augmented reality device is located, wherein the environmental illumination characteristics include at least one of a position of a light source within an environment in which the augmented reality device is located, an angle of the light source, an indication of whether the light source is omnidirectional, a color of the light source, an intensity of the light source and a reflectivity value of the first physical object; and
  adjusting the appearance of the augmented first physical object based on the measured one or more environmental illumination characteristics.

13. The computer-readable memory of claim 10, wherein the visual scene is augmented to include one or more virtual objects, and the operation further comprising:
  determining one or more illumination effects associated with a first one of the one or more virtual objects,
  wherein the visual scene is augmented further based on the determined one or more illumination effects.

14. The computer-readable memory of claim 10, wherein identifying the first physical object as a first predetermined object type, based on one or more object identifiers associated with the first physical object, further comprises:
  receiving a signal associated with the first physical object; and
  processing the received signal to determine the one or more object identifiers that are encoded within the signal.

15. The computer-readable memory of claim 10, wherein identifying the first physical object as a first predetermined object type, based on one or more object identifiers associated with the first physical object, further comprises:
  detecting an embedded marker within the first physical object; and
  determine the first physical object corresponds to the first predetermined object type, based on the detected embedded marker.

16. The computer-readable memory of claim 15, wherein the embedded marker is embedded in the first physical object using an infrared-absorbing material, and wherein the embedded marker is detected using an infrared camera coupled to the augmented reality device.

17. The computer-readable memory of claim 10, the operation further comprising:
  inserting an animated virtual character into the visual scene,
  wherein the animated virtual character is depicted in the rendered sequence of frames as interacting with the first physical object in the rendered sequence of frames, based on the retrieved predefined geometric information.

18. The computer-readable memory of claim 17, further comprising:
    determining one or more dynamics rules based on the first physical object, wherein the one or more dynamics rules govern the physics that apply to the animated virtual character; and
    affecting the interaction between the animated virtual character and the first physical object based on the determined dynamics rules.

19. An augmented reality device, comprising:
    a processor; and
    a memory containing a program that, when executed by the processor, performs an operation for displaying a first physical object, comprising:
    capturing a visual scene for display, wherein the visual scene includes the first physical object and wherein the visual scene is captured using one or more camera devices;
    classifying the first physical object as a first predetermined object type, based on one or more object identifiers associated with the first physical object;
    upon classifying the first physical object as the first predetermined object type, retrieving predefined geometric information corresponding to the first predetermined object type, wherein the predefined geometric information provides a three-dimensional model describing a shape of objects of the first predetermined object type, and wherein the predefined geometric information specifies a first region of the three-dimensional model and one or more augmentations applicable to the first region of the objects of the first predetermined object type;
    determining which one of a plurality of configurations the first physical object is currently in, wherein the first physical object is capable of being physically manipulated into each of a plurality of configurations; and
    rendering a sequence of frames for display in which the first region of the first physical object within the captured visual scene is animated in a predefined manner depicting a virtual light source within the first physical object, based on the determined configuration of the first physical object, by applying the one or more augmentations to a first virtual object generated based on the retrieved predefined geometric information corresponding to the first physical object in the captured visual scene.

20. The augmented reality device of claim 19, wherein identifying the first physical object as the first predetermined object type further comprises:
    analyzing the visual scene to determine a plurality of edges of the first physical object within the visual scene,
    wherein the first predetermined object type is identified further based on the determined plurality of edges.

21. The augmented reality device of claim 19, the operation further comprising:
    measuring one or more environmental illumination characteristics of an environment in which the augmented reality device is located, wherein the environmental illumination characteristics include at least one of a position of a light source within an environment in which the augmented reality device is located, an angle of the light source, an indication of whether the light source is omnidirectional, a color of the light source, an intensity of the light source and a reflectivity value of the first physical object; and
    adjusting the appearance of the augmented first physical object based on the measured one or more environmental illumination characteristics.

22. The augmented reality device of claim 19, wherein the visual scene is augmented to include one or more virtual objects, and the operation further comprising:
    determining one or more illumination effects associated with a first one of the one or more virtual objects,
    wherein the visual scene is augmented further based on the determined one or more illumination effects.

23. The augmented reality device of claim 19, wherein identifying the first physical object as a first predetermined object type, based on one or more object identifiers associated with the first physical object, further comprises:
    receiving a signal associated with the first physical object; and
    processing the received signal to determine the one or more object identifiers that are encoded within the signal.

24. The augmented reality device of claim 19, wherein identifying the first physical object as a first predetermined object type, based on one or more object identifiers associated with the first physical object, further comprises:
    detecting an embedded marker within the first physical object; and
    determine the first physical object corresponds to the first predetermined object type, based on the detected embedded marker.

25. The augmented reality device of claim 24, wherein the embedded marker is embedded in the first physical object using an infrared-absorbing material, and wherein the embedded marker is detected using an infrared camera coupled to the augmented reality device.

26. The augmented reality device of claim 19, the operation further comprising:
    inserting an animated virtual character into the visual scene,
    wherein the animated virtual character is depicted in the rendered sequence of frames as interacting with the first physical object in the rendered sequence of frames, based on the retrieved predefined geometric information.

27. The augmented reality device of claim 26, further comprising:
    determining one or more dynamics rules based on the first physical object, wherein the one or more dynamics rules govern the physics that apply to the animated character; and
    affecting the interaction between the animated virtual character and the first physical object based on the determined dynamics rules.

* * * * *